Dec. 5, 1967

W. E. CORY ET AL 3,356,170

RAILROAD TRACK WEIGHT DETECTOR

Filed Oct. 22, 1964

INVENTORS,
WILLIAM E. CORY,
JACK B. JOHNSON
BY Hastings Ackley
and
Walter J. Jagmin Dec. 5, 1967　　　W. E. CORY ET AL　　　3,356,170
RAILROAD TRACK WEIGHT DETECTOR
Filed Oct. 22, 1964　　　　　　　　　　　　　　　3 Sheets-Sheet 2

FIG. 4

INVENTORS,
WILLIAM E. CORY,
JACK B. JOHNSON
BY Hastings Ackley
and
Walter J Jagmin

FIG. 5

INVENTORS,
WILLIAM E. CORY,
JACK B. JOHNSON

United States Patent Office 3,356,170
Patented Dec. 5, 1967

3,356,170
RAILROAD TRACK WEIGHT DETECTOR
William E. Cory and Jack B. Johnson, San Antonio, Tex., assignors to Sands Measurement Corporation, Dallas, Tex., a corporation of Texas
Filed Oct. 22, 1964, Ser. No. 405,737
15 Claims. (Cl. 177—163)

ABSTRACT OF THE DISCLOSURE

An apparatus for sensing the position of a moving body as it moves over a beam. A control circuit for a transducer whose output varies with the location of application of a mechanical force to the transducer which provides a control signal at the time of application of the mechanical force to the transducer at a predetermined location thereon.

---

This invention relates to control circuits and more particularly to a control circuit responsive to the phase reversal of an alternating current for controlling the operation of an apparatus and to a transducer the amplitude and phase of whose alternating current output transmitted to the control circuit changes in accordance with the location of the point of application of a mechanical force thereto.

Weighing apparatus for weighing moving bodies or loads of the type disclosed in the co-pending application of Seymour H. Raskin and Frank G. Vitiello, Ser. No. 226,957, filed Sept. 28, 1962, now Patent No. 3,159,227 and the co-pending application to Seymour H. Raskin, Ser. No. 226,514, filed Sept. 27, 1962, now Patent No. 3,155,-184, these applications and patents and this application being assigned to the same assignee includes a weigh rail or beam supported at its ends which deflects downwardly as the load moves thereover and a means for sensing and measuring the deflection of the beam. It is important that the output of the deflection sensing and measuring means be measured at the instant the moving load is at the midpoint of the span of the weigh beam since extraneous forces have no or the minimal effect upon the vertical deflection of the beam or the effects of such extraneous forces are balanced or compensated at the instant the moving load is at the midpoint of the span. It is therefore desirable that the output of such deflection sensing and measuring means be translated by any suitable computer into an indication of the weight of the load on the weigh beam at the time that the moving load is at the midpoint of the span of the weigh beam and that a control circuit be provided which transmits an electric signal to the computer at the instant the moving load is at the midpoint of the span of the weigh beam to cause the computer to translate the output of the deflection sensing and measuring into the indication of the weight of the load.

Accordingly, it is an object of this invention to provide a new and improved control circuit for transmitting an electric signal at the instant a moving load is at the midpoint of the span of the beam.

Another object is to provide a control apparatus including a transducer, such as a beam supported at points spaced along its length, means, such as strain gauges secured to the beam, for measuring the vertical deflection of the beam as a load moves along the beam, and a control circuit including means responsive to the variations in the resistances of the strain gauges for producing an alternating current output whose phase reverses or shifts 180 degrees at the instant the moving load is at the midpoint of the weigh beam and means responsive to the phase reversal of the alternating current output for producing a direct current control signal for controlling the operation of another device, such as a computer.

Still another object is to provide a control apparatus including a transducer having an alternating current output whose phase changes in accordance with the location of the point of application of a mechanical force thereto, the control apparatus controlling the operation of a device such as a computer, by transmitting to such apparatus an electric control signal at the instant of reversal of the phase of the alternating current output of the transducer.

A further object is to provide a control apparatus including a beam supported at points spaced along the length thereof and a pair of strain gauges secured to the beam at points spaced equidistantly from the midpoint of the beam whose resistance varies in accordance with the deflection of the beam at the location of the strain gauges, wherein the strain gauges are connected in a bridge excited by an alternating current and wherein the alternating current output of the bridge varies in phase and amplitude as a load moves across the beam, the phase of the alternating current output shifting 180 degrees at the instant the moving load is at the midpoint of the span of the beam.

A still further object is to provide a control apparatus including a transducer excited by an alternating current the phase of whose alternating current output varies in accordance with the application of a mechanical force thereto, a phase comparator for comparing the phase of the exciting alternating current with the phase of the alternating current output of the transducer and means responsive to the output of the phase comparator for producing a direct current control signal when the phase of the alternating current output of the transducer shifts 180 degrees from the phase of the exciting alternating current.

A still further object is to provide a control circuit including a balancing means responsive to the output of the phase comparator for balancing any extraneous output of the bridge when no load is moving across the beam whereby the direct current control signal is produced only when a load moves across the beam.

Additional objects and advantages of the invention will be readily apparent from the reading of the following description of a device constructed in accordance with the invention, and reference to the accompanying drawings thereof, wherein:

Figure 1:
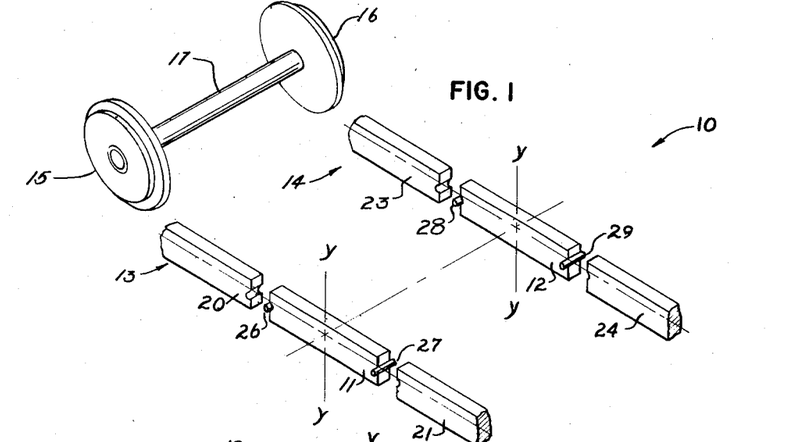
FIGURE 1 is a schematic exploded view of a weighing apparatus for weighing railroad vehicles and employing the control apparatus and control circuit embodying the invention.
Figure 2:
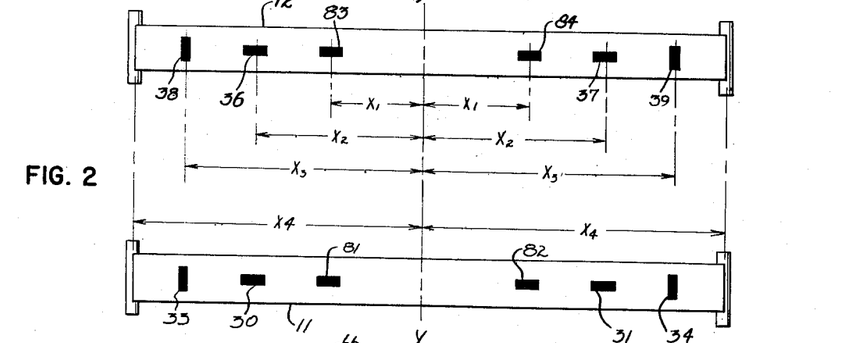
FIGURE 2 is a schematic bottom view of the weigh rails of the weighing apparatus illustrated in FIGURE 1 showing the location of the means for sensing and measuring the weight of loads moving over the weigh rails and the strain gauges for sensing the position of the loads on the weigh rails.
Figure 3:
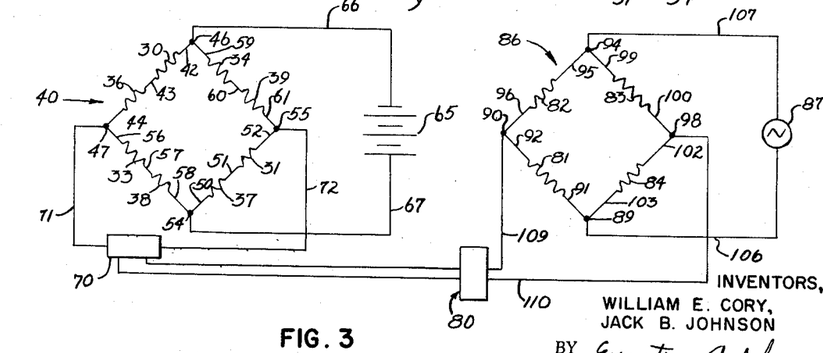
FIGURE 3 is a partly schematic and partly block diagram of the electric circuit of the weighing apparatus illustrated in FIGURES 1 and 2.

Referring now particularly to FIGURES 1 through 3 of the drawing, the weighing apparatus 10 for weighing railroad vehicles includes a pair of weigh rails 11 and 12 which constitute sections of the track rails 13 and 14, respectively, along which the wheels 15 and 16 of a railway vehicle, rotatable on a common axle 17, or about a common axis, may roll. The weigh rail 11 extends between the adjacent spaced ends of the sections 20 and 21 of the track rail 13 and the weigh rail 12 extends between the adjacent spaced ends of the sections 23 and 24 of the rail track 14. The weigh rail 11 is supported at its ends by the pair of horizontal support pins 26 and 27 which may be secured to any suitable support structure and the weigh rail 12 is similarly supported at its ends by the support pins 28 and 29 so that the weigh rails are free to deflect downwardly as a load, such as the wheels 15 and 16, rolls thereover. It will be apparent that as the wheels 15 and 16 roll along the tracks 13 and 14 from the rail sections 20 and 23 onto the weigh rails 11 and 12 and then onto the rail sections 21 and 24, the weigh rails will deflect downwardly as the wheels move or roll thereover and that the deflection of the weigh rails is proportional to the weight of the load imposed thereon by the wheels as is more fully explained in the co-pending application of Seymour H. Raskin, Ser. No. 226,514.

The weigh rail 11 has a pair of load sensing strain gauges 30 and 31 bonded to its bottom surface whose electric resistances vary directly as the strain of the weigh rail at the points at which the load sensing strain gauges 30 and 31 are secured to the weigh rail due to the longitudinal elongation of the bottom of the rail due to downward bending. The load sensing gauges 30 and 31 are spaced equally from midpoint or central vertical axis Y—Y of the span of the beam or weigh rail 11. An additional pair of temperature compensating and load sensing strain gauges 33 and 34, spaced equally from the midpoint or central vertical axis Y—Y of the span of the weigh rail, are also bonded to the bottom surface of the weigh rail 11 and their electrical resistances decrease as the weigh rail bends downwardly during the passage of a load thereover and the transverse width of the rail at the points of location of these strain gauges 33 and 34 decreases in accordance with Poisson's ratio.

The weigh rail 12 is similarly provided with a pair of load sensing devices, such as the strain gauges 36 and 37 bonded in any suitable manner to the bottom surface of the weigh rail 12. The electric resistances of the strain gauges 36 and 37 vary directly as the strain of the weigh rail at the points at which load sensing strain gauges 36 and 37 are secured to the weigh rail 12 due to the longitudinal elongation of the bottom of the rail due to downward bending. The load sensing strain gauges 36 and 37 are spaced equally from the midpoint or central axis Y—Y of the span of the beam or weigh rail 12. An additional pair of temperature compensating and load strain gauges 38 and 39, spaced equally from the midpoint of the span of the weigh rail 12, are also bonded to the bottom surface of the weigh rail 12 and their electrical resistances decrease as the weigh rail 12 bends downwardly during the passage of a load thereover and the transverse width of the rail at the points of location of these strain gauges decreases in accordance with Poisson's ratio.

As is more fully described and explained in Patent No. 3,155,184, the strain gauges are connected in an electric bridge network 40 in such a manner that the increases in the resistances of the strain gauges 30, 31, 36 and 37 and the decrease in the resistances of the strain gauges 33, 34, 38 and 39, as the wheels 15 and 16 roll over the weigh rails and deflect the rails downwardly, increases the unbalance of the bridge and increases the voltage output of the bridge. The strain gauges 30 and 36 are connected in series by the conductors 42, 43 and 44 to constitute one arm of the bridge network between the input and output terminals 46 and 47 of the bridge 40 and the strain gauges 31 and 37 are connected in series by the conductors 50, 51 and 52 to constitute a second arm of the bridge network between the input and output terminals 54 and 55 of the bridge network. The strain gauges 33 and 38 are similarly connected in series by the conductors 56, 57 and 58 to constitute the third arm of the bridge network between the output and input terminals 47 and 54 of the bridge network. Similarly the strain gauges 34 and 39 are connected in series by the conductors 59, 60 and 61 to constitute the fourth arm of the bridge network between the input and output terminals 46 and 55 of the bridge.

The input terminals 46 and 54 of the bridge network 40 are connected to the opposite sides of a suitable source of direct current, such as the battery 65, by the conductors 66 and 67, respectively. The output terminals 47 and 55 of the bridge network are connected to any suitable computer device 70 by means of the conductors 71 and 72, respectively. The computer device 70 may be of any suitable type which translates the output of the bridge network 40, which is proportional to the deflection of the two weigh rails 11 and 12, into an indication of the weight of the load on the two rails as the wheels 15 and 16 roll thereover. The computer device may of course include a recording device which records the combined weight of the load imposed on the weigh rails 11 and 12 by the wheels as they roll thereover.

It will be apparent that the strain gauges 30, 31, 36 and 37 are connected in the bridge network 40 in such a manner that when the resistances of these strain gauges increase with the rise in temperature, and therefore with the expansion, of the weigh rails and tend to unbalance the bridge network and increase the output thereof in one direction, the simultaneous increase in the resistances of the strain gauges 33, 34, 38 and 39 tend to increase the output of the bridge network in the opposite direction and thus maintain the output of the bridge network at a desired normal value. The resistances of the temperature compensating strain gauges 33, 34, 38 and 39 tend to decrease as the load imposed on, and therefore the deflection of, the weigh rails increases and since they are connected in the bridge network in such manner that a decrease in these resistances tends to unbalance the bridge network and increase the voltage output thereof across the output terminals 47 and 55, the temperature compensating strain gauges also tend to increase the output of the bridge network in accordance with the deflection of the weigh rails. The resistances of the strain gauges 30 31, 36 and 37 are preferably equal as are the resistances of the strain gauges 33, 34, 38 and 39 so that the output of the bridge network across the output terminals 47 and 55 will vary in proportion with the deflection of, and therefore with the load imposed on, the rails by the wheels 15 and 16, as they roll thereover. As is fully explained in the co-pending application, Ser. No. 226,514, in order to obtain the weight of the load most accurately, the vertical downward deflection of the weigh rails 11 and 12 is preferably measured at the instant that the wheels 15 and 16 are at the midpoints of the spans of the weigh rails 11 and 12 since at this instant the effects of extraneous forces, other than the vertical forces causing downward deflections of the weigh rails due to the load thereon, are cancelled out or at a minimum. The mechanical switch illustrated in the co-pending application, Ser. No. 226,957, which is actuated by the wheel at the instant that it moves past the midpoint of the span of the weigh rail to cause the computer to translate the output of the bridge network into an indication of the weight of the load imposed on the weigh rail by the wheel is not satisfactory where extremely great accuracy in the measurement of the weight of the load is desired.

The control circuit 80 embodying the invention provides the desired great accuracy since it is not mechanically actuated by the wheel or load itself but is responsive to the deflection of the weigh rails at the instant the load is at the midpoints of the spans of the weigh rails as sensed by the location strain gauges 81 and 82 bonded to the bottom surface of the weigh rail 11 and the location strain gauges 83 and 84 bonded to the bottom surface of the weigh rail 12. The electric resistances of these strain gauges vary directly as the strains of the weigh rails at the points at which the location sensing strain gauges are secured to the weigh rails due to the longitudinal elongation of the bottoms of the weigh rails due to downward bending. The location sensing gauges 81 and 82 are spaced equally from the midpoint or central vertical axis Y—Y of the span of the beam of the weigh rail 11 and the location sensing gauges 83 and 84 are similarly spaced equally from the midpoint of central axis Y—Y of the span of the beam or weigh rail 11. The location sensing strain gauges are connected in a bridge or bridge network 86 which is excited from any suitable source 87 of alternating current in such manner that when the wheels 15 and 16 move over the weigh rails from the rail sections 20 and 23 to the rail sections 21 and 24, the alternating current output of the bridge network is modulated to first increase then decrease to zero at the instant the wheels are at the midpoints of the weigh rails 11 and 12, and at that instant its phase shifts or reverses 180 degrees, then increase and finally decrease to zero or a minimum again as the wheels move off the weigh rails.

The location strain gauge 81 is connected between the input and output terminals 89 and 90, respectively, of the bridge network by the conductors 91 and 92 to constitute one of the arms of the bridge, the strain gauge 82 is similarly connected between the input and output terminals 94 and 90, respectively, of the bridge network by the conductors 95 and 96 to constitute a second arm of the bridge network, the location strain gauge 83 is similarly connected between the input and output terminals 94 and 98, respectively, of the bridge network by the conductors 99 and 100 to constitute the third arm of the network, and the location strain gauge 84 is connected between the input and output terminals 89 and 98 of the bridge by the conductors 102 and 103 to constitute the fourth arm of the bridge. The source of exciting alternating current is connected to the input terminals 89 and 94 by the conductors 106 and 107 and the output terminals 90 and 98 are connected to the control circuit 80 by the conductors 109 and 110.

The resistances of the location strain gauges are preferably equal so that as the wheels 15 and 16 roll over from the rail sections 20 and 23 onto the weigh rails 11 and 12 and deflect the weigh rails downwardly, the resistances of all strain gauges increase due to the elongation of the bottom surfaces of the weigh rails due to downward bending of the rails. The increase in the resistances of strain gauges 81 and 83 which are nearest the approach rail sections 20 and 21 increase more rapidly than the resistances on the strain gauges 82 and 84 as the wheels move to a point intermediate the ends of the weigh rails nearest the approach rails and the midpoints of the spans of the two weigh rails. This difference in changes in resistances of these two pairs of strain gauges causes the bridge to unbalance in one direction since the resistance of the network arm between the input and output terminals 98 and 94 increases relative to the resistance of the network arm between the input and output terminals 94 and 90 and since simultaneously the resistance of the network arm between the input and output terminals 89 and 90 increases relative to the resistance of the network arm between the input and output terminals 89 and 98. As a result, if the input terminal 94 is now positive relative to the input terminal 89, the output terminal 90 is positive relative to the output terminal 98. As the wheels move from such intermediate points over the gauges 81 and 83 to the midpoints of the spans of the beams, the resistances of the strain gauges 81 and 83 decrease. The downward deflection of the beam increases and reaches its maximum at the midpoints of the spans of the beams when the wheels are at the midpoints of the spans. At the same time, the resistances of the strain gauges 82 and 84 increase since the wheels now move closer to the locations of the strain gauges 82 and 84 and, when the wheels are at the midpoints of the span of the weigh rails, become equal to the resistances of the strain gauges 81 and 83. At this time the unbalance of the bridge is zero and no current then flows between the output terminals 90 and 98 of the bridge. Continued movement of the wheels towards the rail sections 21 and 24 from the midpoints of the spans of the weigh rails then causes the resistances of the strain gauges 82 and 84 to continue to increase and the resistances of the strain gauges 81 and 83 to continue to decrease so that the bridge network now unbalances in the opposite direction and, if the input terminal 94 is now positive relative to the input terminal 89, the output terminal 90 is negative relative to the output terminal 98. This reversal of the polarity of the two output terminals for a given relative polarity of the input terminals constitutes a 180 degree shift or reversal in phase of the alternating current output of the bridge networks. Thereafter, as the wheels continue to move toward the rail sections 21 and 24, the resistances of the strain gauges continue to increase until the wheels are positioned over these strain gauges while the resistances of the strain gauges 81 and 83 continue to decrease. The resistances of all the strain gauges then decreases as the wheels continue to move, the rate of decrease of the resistances 82 and 84 being greater than the rate of decrease of the resistances of the strain gauges 81 and 83 until the wheels roll off the weigh rails and onto the rail sections 21 and 24. At this time the resistances of all the strain gauges are again equal and no current flows between the output terminals 90 and 98. The wave form of the alternating current output of the location bridge network during the movement of a pair of wheels over the weigh rails thus varies in phase and amplitude as indicated at A in FIGURE 4, the amplitude of the alternating current being zero and its phase reversing or shifting 180 degrees as the wheels move over the midpoints or central axes Y—Y of the spans of the weigh rails.

While the amplitude of the alternating current output of the location bridge network 86 varies with the weight of the combined load imposed on the two weigh rails as the wheels 15 and 16 roll thereover and cannot therefore be employed to sense or give an indication of the location of a load on the weigh rails where successive pairs of wheels impose loads of different magnitudes, the output theoretically always drops to zero at the instant the wheels are at the midpoints of the spans of the weigh rails and the phase thereof reverses or shifts 180 degrees at that instant and therefore the control circuit 80 produces a voltage pulse or signal at the instant of reversal of the phase of the alternating current output of the location bridge network 86 to cause the computer to translate the output of the load weight sensing bridge 40 to an indication of the weight of the load at the instant that the wheels are at the midpoints of the spans of the weigh rails.

It has been assumed that the wheels 15 and 16 move in exact alignment over the weigh rails 11 and 12 and that they arrive at the same instant at the midpoints of the weigh rails 11 and 12. Should the common axis of rotation of such wheels deviate by a small angle from a position exactly perpendicular to the longitudinal axes of the two weigh rails, one of the wheels will move over the midpoint of the span of its weigh rail before the other moves over the midpoint of the span of its weigh rail. Any such deviation however will be small and the provision of the location strain gauges on both of the weigh rails causes the reversal of the output of the location bridge network to occur when the two wheels are disposed at opposite sides of the midpoints of the spans of the weigh rails thus averaging out or minimizing any error in the timing of the instant of operation of the computer and of the output of load sensing and measuring bridge network 40.

If desired, only one of the weigh rails, for example, the weigh rail 11, may be provided with the location sensing strain gauges in which case the location bridge network 86 would be provided with standard gauges or equal resistances in place of the strain gauges 83 and 84. Both the load sensing bridge network 40 and the location sensing bridge network 86 may be provided with suitable calibrating resistances in the various arms thereof or in the various input conductors 66, 67, 106 and 107 thereto.

It will be apparent that a weigh rail provided with the location strain gauges constitutes a transducer since the deflection of the weigh rail produces a variation in the characteristics of an electric alternating current, such as the amplitude and the phase thereof, in accordance with the location of the point of application of a mechanical force along the length of such weigh rail causing such deflection.

Figure 4:
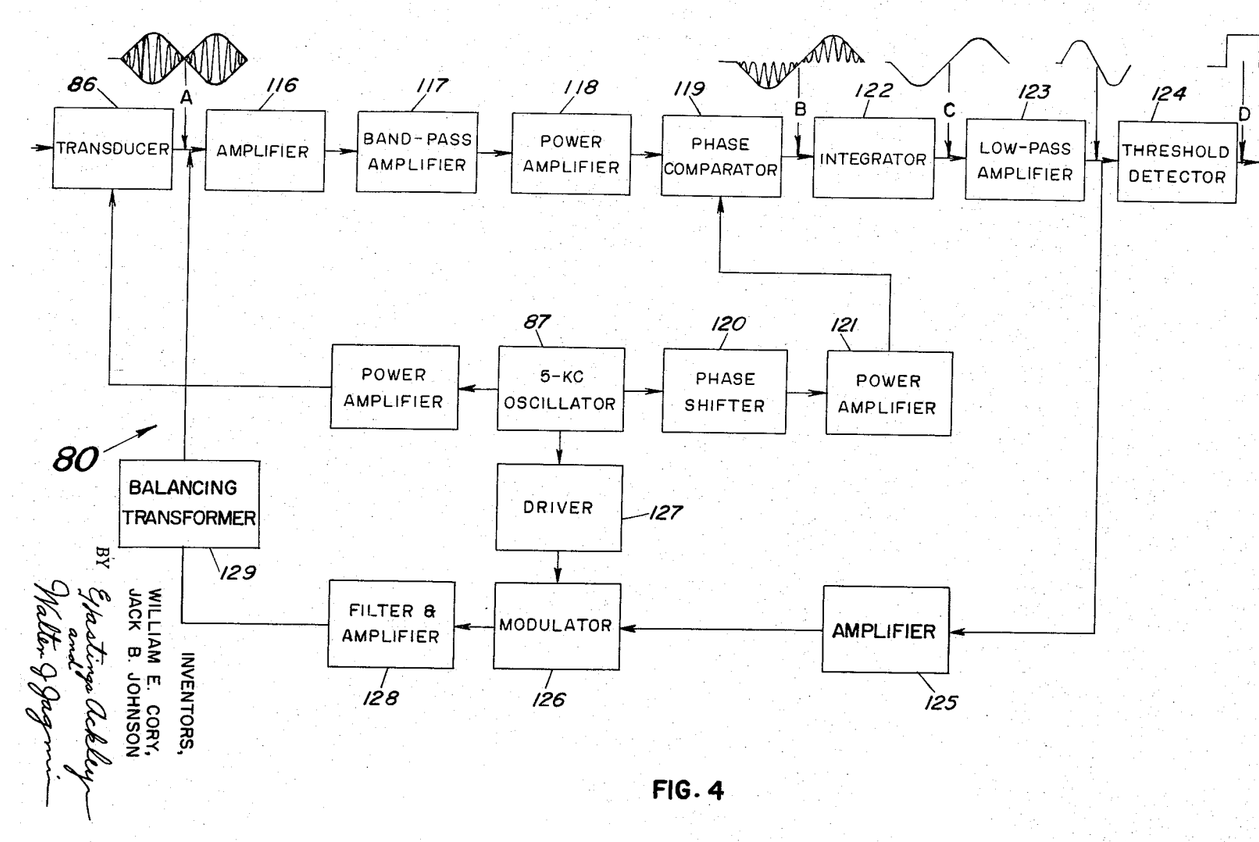
FIGURE 4 is a block diagram of the control circuit embodying the invention; and, FIGURE 5 is a schematic diagram of the control circuit embodying the invention.

Referring now particularly to FIGURE 4 of the drawings, the control circuit 80, which is responsive to the phase reversal of the alternating current output of the transducer 86 and which produces a direct current signal or pulse which is transmitted to such apparatus as the computer 70 to cause it to function at the instant of the reversal of the phase of the alternating current output of the transducer, includes the source of alternating current 87, such as a suitable oscillator 87 whose alternating current output of a standard or reference high frequency is applied across the load location sensing bridge network or transducer 86. The output of the transducer as the wheels move over the weigh rails is transmitted through a primary amplifier 116, a band pass amplifier 117 which further amplifies the output of the primary amplifier 116 and also filters out frequencies higher and lower than the reference frequency, and the power amplifier 118 to the phase comparator or discriminator 119. The phase of the modulated, filtered and amplified alternating current output of the transducer is compared by the phase comparator with the phase of the alternating current output of the oscillator which is transmitted to the phase comparator through a phase shifter 120 and a power amplifier 121. The phase of the oscillator output transmitted to the phase comparator is either in phase with the alternating current transmitted to the phase comparator from the transducer or 180 degrees out of phase therewith so that the output of the phase comparator has the wave form indicated at B and its amplitude is proportional to the amplitude of the alternating current output of the transducer. The phase shifter 120 is provided to permit adjustment of the phase of the alternating current transmitted to the phase comparator from the oscillator as may be necessary to compensate for any phase shift occurring in the various components of the control circuit. The output of the phase comparator is transmitted to the integrator 122 which eliminates the carrier frequency so that its output has the wave form illustrated at C. The output of the integrator is transmitted through a low pass amplifier 123 to a threshold detector 124 which produces a positive substantially square wave or pulse signal, as indicated at D, at the instant that the output of the integrator 122 passes through zero and reverses polarity. The square wave output of the threshold detector thus provides a signal, which may function as a logic trigger, for the computer 70 to cause it to perform its desired function at the instant that the output of the transducer 86 reverses or shifts its phase to 180 degrees.

While theoretically the output of the transducer 86 is zero when no load is present on the weigh rails, the transducer may have an output even when no load is present. In order to balance such undesired output or signal of the transducer, the output of the low pass amplifier 123 is transmitted through a long term constant amplifier and integrator 125, which does not pass the short term wave output of the low pass amplifier due to the movement of the wheels over the weigh rails but which does pass any long term unbalance output, to a modulator 126 which modulates the alternating current output of the oscillator 87 transmitted to the modulator through a driver 127. The output of the modulator 126 is transmitted through a filter and amplifier 128 to cause an alternating current whose frequency and amplitude is equal to and whose phase is opposite to the alternating current output of the transducer when no load or wheel is applied to the transducer, to a winding of a balance transformer 129 to cancel out such long term unbalance output of the transducer 86 which is transmitted to another winding of the balance transformer.

It will thus be apparent that the control circuit 80 includes a means for comparing the phase of the modulated alternating current output of the transducer with an alternating current of the same or standard frequency, which is either in phase with the alternating current output of the transducer or 180 degrees displaced in phase with the alternating current of the transducer, which produces an alternating current signal whose polarity is determined by the phase difference between the alternating current output of the transducer and the standard or reference frequency and whose amplitude is proportional to the amplitude of the modulated alternating current output of the transducer, an integrator for eliminating the standard or carrier frequency from the phase comparator output, and a means such as the threshold detector, responsive to the change in the polarity of the output of the integrator for producing a direct current voltage pulse or signal at the instant of the reveral of phase of the alternating current output of the transducer.

It will further be seen that the control circuit includes a balancing means which detects any long term unbalance output of the transducer and provides an alternating current of the same frequency whose amplitude is equal to and whose phase is opposite to that of such long term unbalance output of the transducer to cancel out the long term unbalance output of the transducer.

Figure 5:
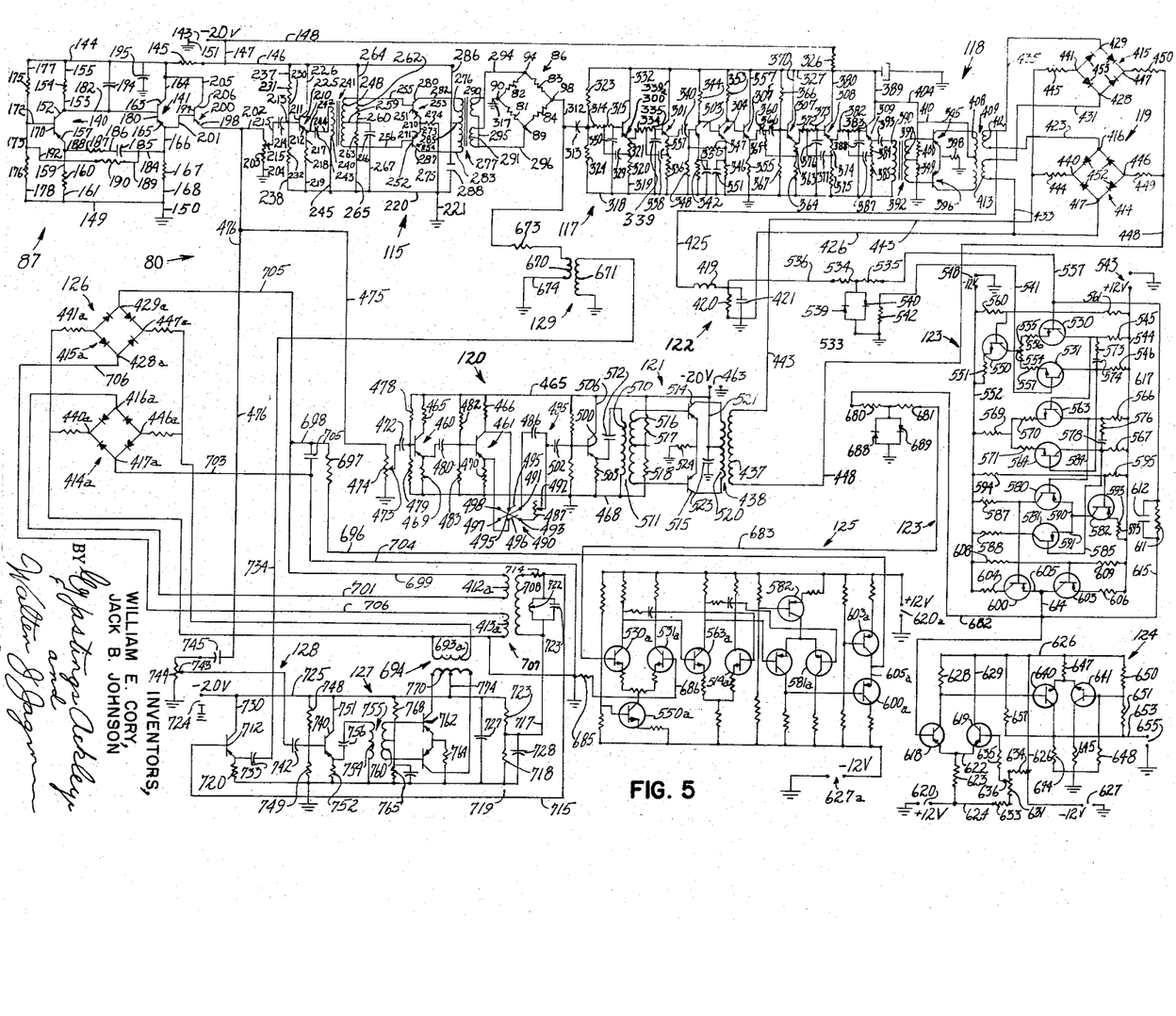

Referring now particularly to FIGURE 5 of the drawing, the oscillator 87, which supplies the alternating current of standard or reference frequency to the transducer or bridge network 86, the phase comparator 119 and the modulator 126, may be of the RC feedback type and include a pair of transistors 140 and 141 whose emitter-collector circuits are connected across the source 143 of negative direct current by means of the conductor 144 which is connected to the negative side of the direct current source by the resistance 145 and the conductors 146, 147 and 148 and by the conductor 149 which is connected to the other side of the source through the conductor 150, ground and the conductor 151. The collector 152 of the transistor 140 is connected to the conductor 144 by the conductor 153, the resistance 154 and the conductor 155 and the emitter 157 thereof is connected to the conductor 149 by the conductor 159, the resistance 160 and the conductor 161. The collector 163 of the transistor 141 is connected to the conductor 144 by the conductor 164 while its emitter 165 is connected to the conductor 149 by the conductor 166, the resistance 167 and the conductor 168. The base 170 of the transistor 140 is connected by the conductor 172 to the conductor 173 which connects the adjacent ends of the resistances 175 and 176 whose other ends are connected to the conductors 144 and 149 by the conductors 177 and 178, respectively. The base 180 of the transistor 141 is connected to the emitter 152 of the transistor 140 by the conductor 182 and its emitter 165 is connected to the emitter 157 of the transistor 140 by the conductors 166 and 184, the capacitor 185, the conductor 186, the resistance 187 and the conductor 188. The emitter 165 is also connected by the conductors 166, 184 and 189, the resistance 190 and the conductor 192 to the conductor 173. The capacitor 194 is connected between the conductor 144 and the conductor 182 and the capacitor 195 is connected across the conductor 144 and ground to smooth out the wave form of the alternating current output of the transistor 141. It will be apparent that when the conductors 144 and 150 are connected across the source 143, the frequency of the cyclic variation in the conductivity of the collector-emitter circuit of the transistor 141 will vary in accordance with the relative values of the resistances 187 and 190 and of the capacitor 185. This output of the transistor 141 is across the base 197 and emitter 198 of the output transistor 200 of the oscillator, the base of the output transistor being connected to one side of the resistance 167 by the conductors 201 and 166 and its emitter 198 being connected to the other side of the resistance 167 by the conductor 202, the resistance 203, the conductor 204, ground and the conductors 150 and 168. The collector-emitter circuit of the output transistor is connected across the source 143 since the conductor 205 connects its collector 206 to one side of the source through the conductors 164 and 144, the resistance 145 and the conductors 146 and 147 while its emitter is connected to the other side of the source through the conductor 202, the resistance 203, the conductor 204, ground and the conductor 151.

The amplifier or driver 115 for the bridge network or transducer 86 may be of the push pull type and include an input transistor 210 across whose base 211 and emitter 212 is impressed the output of the output transistor 200 of the oscillator 87, the base 211 being connected to the resistance 203 by the conductor 213, the blocking capacitor 214, the adjustable contact 215 and the emitter 212 being connected to the opposite side of the resistance 203 by the conductor 217, the resistance 218, the conductors 219, 220 and 221, the ground and the conductor 204. The collector 225 and emitter 212 circuit of the transistor 210 is connected across the source of negative direct current 143 by the conductors 147, 146, 226 and 217, the resistance 218, the conductors 219, 220 and 221, ground and the conductor 151. Biasing voltage is applied to the base 211 of the driver input transistor 210 through the conductor 213 connected to the conductor 230 which connects adjacent sides of the resistances 231 and 232 whose other sides are connected to the conductors 146 and 220 by the conductors 237 and 238, respectively.

The primary winding 240 of the input transformer 241 of the driver 115 is energized by the output of the input transistor being connected across the resistance 218 by the conductor 242, the blocking capacitor 243 and the conductors 244, 245, 220 and 219. Opposite sides of the secondary winding 248 of the input transformer 241 are connected to the bases 251 and 252 of the amplifying transistors 253 and 254 by the conductors 255 and 256, respectively, while the electric midpoint of the secondary winding is connected by the conductor 259 to the conductor 260 which connects adjacent sides of the voltage divider resistances 262 and 263 connected in series across the direct current source 143 by the conductors 147, 146, 264, 260, 265, 220, 221 and 151. A capacitor 266 is connected across the resistance 265 by the conductors 259, 260, 265, 220 and 267.

The emitters 270 and 271 of the transistors 253 and 254 are connected to the electrical midpoint of the secondary winding 248 through the conductor 273, the resistance 274 and the conductors 275, 220, and 265, the resistance 263 and the conductors 260 and 259 whereby the conductivities of the two transistors 253 and 254 are periodically and alternately increased and decreased to cause current to flow through opposite halves of the primary winding 276 of the output transformer 277. The collectors 280 and 281 of the transistors 253 and 254, respectively, are connected to one side of the source 143 by the conductors 282 and 283 which connect them to opposite sides of the primary winding 276, the conductor 285 which is connected to the electrical midpoint of the primary winding and the conductors 286, 146 and 147.

The emitters 270 and 271 are of course connected to the other side of the source of direct current through the conductor 273, the resistance 274, the conductors 275 and 221, ground and the conductor 151. A capacitor 288 may be connected between the electrical midpoint of the primary winding 276 and ground to help shape the wave form of the electric current induced in the secondary windings 290 and 291 of the output transformer 277 of the power amplifier or driver 115.

The secondary windings of the output transformer are connected in parallel across the input terminals 94 and 89 of the location bridge network 86 by means of the conductor 294 which connects one pair of sides of the secondary windings to the input terminal 94 and the conductors 295 and 296 which connect the other sides of the two secondary windings to the input terminal 89.

The band pass amplifier 117 to which the output of the location bridge network 86 is transmitted may be of any suitable type and may have a first stage including a pair of transistors 300 and 301 provided with suitable resistance capacitance circuits for filtering high frequencies, a second amplifier stage which includes the transistors 303, 304 and 305 and a third stage which includes the transistors 307, 308 and 309 provided with suitable resistance capacitance circuits for filtering out undesired low frequencies. The output of the location bridge network 86 is applied across the base emitter circuit of the transistor 300, the output terminal 98 of the bridge network being connected to the base of the transistor 300 by means of the conductor 312, the blocking capacitor 313 and the resistances 314 and 315, and the output terminal 90 of the bridge network being connected to the emitter of the transistor 300 by the conductor 317, ground, the conductors 318 and 319, and the serially connected resistances 320 and 321. A biasing potential is applied to the base of the transistor 300 by means of a voltage divider which includes the serially connected resistances 323 and 324 connected across the source of current 143 by means of the conductor 148, the current limiting resistance 326, the conductors 327 and 318, ground and the conductor 151. The common connection of the resistances 314 and 315 is connected to the common connection of the resistances 320 and 321 by the capacitor 329 while the capacitor 330 is connected between the resistance 320 and the common connection of the resistance 315 and the base of the transistor 300. The collector emitter circuit of the transistor is connected across the source of current 143 since its collector is connected to the conductor 327 by the conductor 332 while its emitter is connected to ground through the resistances 321 and 320 and the conductors 319 and 318.

The output of the transistor 300 is applied across the base emitter circuit of the transistor 301, the common connection of the emitter of the transistor 300 and the resistance 321 being connected to the base of the transistor 301 by the serially connected resistances 334 and 335 and the emitter of the transistor 301 being connected to the resistance 320 by the conductors 319 and 318 and the serially connected resistances 336 and 337. The common connection of the resistances 334 and 335 is connected to the common connection of the resistances 336 and 337 by the capacitor 338 and the capacitor 339 is connected between the common connection of resistance 334 and the base of the transistor 301 and the conductor 318. The collector emitter circuit of the transistor 301 is connected across the input source 143 since its collector is connected to the conductor 327 by the conductor 339a and its emitter is connected to ground through the serially connected resistances 336 and 337.

The output of the transistor 301 is applied across the base emitter circuit of the transistor 303, the common connection of the resistance 337 and the emitter of the transistor 301 being connected to the base of the transistor 303 by the blocking capacitor 340 and the resistance 336 being connected to the emitter of the transistor 303 by the conductor 318 and the resistance 342. The collector emitter circuit of the transistor 303 is connected across the source of electric current 143 since its collector is connected to the conductor 327 by the resistance 344 and its emitter is connected to ground by the resistance 342 and the conductor 318.

The output of the transistor 303 is applied across the base emitter circuit of the transistor 304, the common connection of the resistance 344 and the collector of the transistor 303 being connected to the base of the transistor 304 and the common connection of the resistance 346 and the emitter of the transistor 304 being connected by the resistance 347 to the common connection of the resistance 348 and the base of the transistor 303. The resistance 348 connects the base of the transistor 303 to ground. Capacitors 350 and 351 are connected across the resistances 342 and 346 to filter out undesired frequencies. The collector emitter circuit of the transistor 304 is connected across the source of current 143 since its collector is connected to the conductor 327 by the resistance 353 and its emitter is connected to ground through the resistance 346.

The output of the transistor 304 in turn is applied across the base emitter circuit of the transistor 305 since the common connection of the resistance 353 and the collector of the transistor 304 is connected to the base of the transistor 305 and the emitter of the transistor 305 is connected to the resistance 346 through the resistance 355 and the conductor 318. The collector emitter circuit of the transistor 305 is connected across the source 143 since its collector is connected to the conductor 327 by the conductor 357 and its emitter is connected to ground through the resistance 355.

The output of the transistor 305 is applied across the base emitter circuit of the transistor 307, the common connection of the emitter of the transistor 305 and the resistance 355 being connected to the base of the transistor 307 by the serially connected capacitors 360 and 361 and its emitter being connected to the resistance 355 by the serially connected resistances 363 and 364. The common connection of the resistances 363 and 364 is connected to the common connection of the two capacitors 360 and 361 by the resistance 365. The base of the transistor 307 is also connected to a voltage divider comprising the serially connected resistances 366 and 367 which are connected across the input circuit 143 since the resistance 366 is connected to the conductor 327 and the resistance 367 is connected to ground. The collector emitter circuit of the transistor is connected across the source of current 143 since its collector is connected to the conductor 327 by the conductor 370 and its emitter is connected to ground through the resistances 363 and 364.

The output of the transistor 307 is applied across the base emitter circuit of the transistor 308, the common connection of the resistance 363 and the emitter of the transistor being connected to the base of the transistor 308 by the resistances 372 and 373 and the emitter of the transistor 308 being connected to the resistance 364 by the serially connected resistances 374 and 375.

The common connection of the resistances 372 and 373 is connected to the common connection of the resistances 374 and 375 by the capacitor 377 while the capacitor 378 is connected between the resistance 375 and common connection of the resistance 373 and base of the transistor 308. The collector emitter circuit of the transistor 308 is connected across the source 143 since its collector is connected to the conductor 327 by the conductor 380 and its emitter is connected to ground through the resistances 374 and 375.

The output of the transistor 308 in turn is applied across the base emitter circuit of the output transistor 309 of the band pass amplifier, the common connection of the resistance 374 and the emitter of the transistor 308 being connected to the base of the transistor 309 by the serially connected resistances 382 and 383 and the emitter of the transistor 309 being connected to the resistance 375 through the serially connected resistances 384 and 385. The common connection of the resistances 382 and 383 is connected to the common connection of the resistances 384 and 385 by the capacitor 387 and the common connection of the base of the transistor 309 and the resistance 383 is connected to ground by the capacitor 388. The collector emitter circuit of the output transistor is connected across the source 143 since its collector is connected to the conductor 327 by the conductor 399 and its emitter is connected to ground through the resistances 384 and 385.

The current flowing in the primary winding 390 of the input transformer 392 of the power amplifier 118 varies in accordance with the conductivity of the transistor 309, one side of the primary winding being connected through the blocking capacitor 393 to the emitter of the transistor 309 and its other side being connected to ground and thus across the source 143 through the collector emitter circuit of the transistor 309.

The power amplifier 118 may be similar to the push-pull amplifier 116 and includes a pair of transistors 395 and 396 whose bases are connected to opposite sides of the secondary winding 397 of the input transformer 392 and whose emitters are connected to electric midpoint of the secondary winding by the resistance 398, ground and the resistance 399 so that the conductivities of the transistors 395 and 396 vary alternately and periodically in accordance with the alternating current in the primary winding. The electric midpoint of the secondary winding 397 is connected to the common connection of the resistances 399 and 400 to supply bias to the bases of the transistors, these resistances being connected in series across the input circuit source of direct current 143 to form a voltage divider. The resistance 400 is connected to the conductor 327 by the conductors 404 and 389 and the resistance 399 is connected to ground. The collectors of the transistors 395 and 396 are connected to one side of the source of electric current 143 since they are connected to opposite sides of the primary winding 408 of the output transformer 409 of the power amplifier whose electric midpoint is connected to the conductor 327 by the conductors 410, 404 and 389. The emitters of the transistors 395 and 396 are connected to the opposite side of the source of electric current 143 since they are connected to ground through the resistance 398.

The two secondary windings 412 and 413 of the output transformer are connected to the phase comparator or discriminator 119 which may be of a suitable type well known in the art and include a pair of diode bridges 414 and 415. The secondary winding 412 is connected across the opposite terminals 416 and 417 of the semi-conductor bridge 414 through the integrator 122 which may include the serially connected inductance 419 and resistance 420 and the capacitor 421 connected across the resistance 420. One side of the secondary winding 412 is connected to the terminal 416 by the conductor 423 and the other side is connected to the opposite terminal 417 by the conductor 425, the inductance 419, the resistance 420, and the conductor 426. The other secondary winding 413 is similarly connected across the opposite terminals 428 and 429 of the diode bride 415 through the integrator 122, one side of the winding 413 being connected to the terminal 428 by the conductor 431 and its other side being connected to the other terminal 429 by the conductors 433 and 426, the resistance 420, the inductance 419, and the conductors 425 and 435. The two diode bridges 414 and 415 are alternately rendered conductive to permit flow of alternate half cycles of the current induced in the two secondary windings 412 and 413, respectively, through the integrator 122 by an alternating voltage of the same or reference frequency as the frequency of the induced voltages in the secondary windings 412 and 413 when such alternating voltage is either in phase or one hundred and eighty degrees out of phase with the alternating current induced in the secondary windings. One side of the secondary winding 437 of the output transformer 438 of the power amplifier 121 is connected to the terminals 440 and 441 of the diode bridges 414 and 415, respectively, through the conductor 443 and the resistances 444 and 445, respectively, and the other side of the secondary winding is connected to the terminals 446 and 447 of the diode bridges through the conductor 448 and the resistances 449 and 450, respectively. The diodes 452 of the bridge 414, which may be of the germanium type, are so connected between the terminals 440 and 446 that they permit flow of current between the terminals 446 and 417 when the side of the secondary winding 437 connected to the terminal 446 is positive and the side thereof connected to the terminal 440 is negative. The diodes 453 of the diode bridge 415 are so connected that they permit flow of current between the terminals 428 and 429 only when the side of the winding 437 connected to the terminal 441 is positive and the side thereof connected to the terminal 447 is negative.

As was explained above, the phase of the alternating current output of the location bridge network 86 shifts 180 degrees as the wheels move over the midpoints of the spans of the beams or weigh rails and, consequently, the voltages induced in the secondary windings 412 and 413 of the power amplifier output transformer 409 also simultaneously shift 180 degrees. The secondary windings 412 and 413 are connected across the terminals of these two diode bridges in such manner relative to each other and to the secondary winding 437 of the power amplifier 121 that as the wheels move over the weigh rails and toward the midpoints of the spans of the weigh rails, the two diode bridges are rendered conductive only during the negative half cycles of the alternating voltages induced in the secondary windings 412 and 413. As the wheels move past the midpoints of the spans of the weigh rails and the phases of the alternating voltages induced in the secondary windings 412 and 413 shift 180 degrees, the diode bridges are rendered conductive only during the positive half cycles of the alternating voltages induced in the secondary windings 412 and 413. As a result, the output of the phase comparator across the conductors 425 and 426 and thus across the integrator 122, as the wheels move over the weigh rails, varies as indicated at B in FIGURE 4.

The phase shifter 120 may include a pair of amplifying transistors 460 and 461 whose collector emitter circuits are connected across any suitable source of negative voltage 463 since their collectors are connected to one side of the source through the conductor 464 and the resistances 465 and 466, respectively, and their emitters are connected to the other side of the source through ground, the conductor 468 and the resistances 469 and 470, respectively. The base of the transistor 460 is connected to the emitter 198 of the output transistor 200 of the oscillator 87 through the blocking capacitor 472, the adjustable contact 473 of the potentiometer resistance 474 and the resistance 474, one side of the resistance 474 being connected to ground and its other side being connected to the emitter 198 by the conductors 475, 476, and 202. Since the emitter of the transistor 460 is connected to ground through the resistance 469 and the conductor 468, the output of the oscillator is applied across the base emitter circuit of the input transistor 460 of the phase shifter 120. The base of the transistor 460 is connected to the common connection of the serially connected resistances 478 and 479 which constitute a voltage divider and are connected across the source of direct current 463. The output of the transistor 460 is applied across the base emitter circuit of the transistor 461 since the common connection of the resistance 469 and the emitter of the transistor 460 is connected to the base of the transistor 461 through the blocking capacitor 480 and the resistances 469 and 470 are connected to the conductor 468. The base of the transistor 461 is connected to the common connection of the serially connected resistances 482 and 483 which constitute a voltage divider being connected across the conductors 465 and 468 and thus across the source 463.

The output of the transistor 461 is applied across a phase shifting network 485 which includes a capacitor 486 and the potentiometer resistance 487 connected in series across the collector emitter circuit of the transistor 461 through a double pole, double throw switch 490. One side of the capacitor 486 is connected to the stationary contact 491 of the switch 490 and its other side is connected to the potentiometer resistance 487 by the adjustable contact 492. The potentiometer resistance is connected to the stationary contact 493 of the switch. The common connection of the resistance 486 and the collector of the transistor 461 is connected to one of the movable blades or contacts 495 of the switch while the common connection of its emitter and the resistance 470 is connected to the other movable contact 496 of the switch. The stationary contacts 491 and 493 are connected to the stationary contacts 497 and 498, respectively, of the switch so that when the movable contacts are in one extreme position engaging the contacts 491 and 493, the polarity of the potential applied across the capacitor 486 and 487 is the reverse of the polarity of the potential applied thereacross when the movable contacts 495 and 496 are in their other extreme positions in contact with the stationary contacts 497 and 498. The switch 490 may therefore be employed to reverse or shift 180 degrees the phase of the signal or potential applied across the base emitter circuit of the output transistor 500 of the phase shifter whose base is connected to the common connection of the capacitor 486 and the resistance 487 through the blocking capacitor 502 and whose emitter is connected to ground through the resistance 503 and the conductor 468. The phase of the output of phase shift circuit 485 may be adjusted or varied through an angle smaller than 180 degrees by adjustment of the position of the adjustable contact 492 relative to the potentiometer resistance 487 so that the phase of the potential applied across the phase emitter circuit of the output transistor 500 may be shifted through any desired angle to compensate for any phase shift occurring in the various circuits and components of the device to ensure that the reference frequency alternating voltage induced in the secondary winding 437 of the transformer 438 and applied across the two diode bridges is exactly in phase, or exactly 180 degrees out of phase, with the alternating current voltage induced in the secondary windings 412 and 413. The collector emitter circuit of the output transformer 500 of the phase shifter 120 is connected across the source of the current 463 since its collector is connected to the conductor 465 by the conductor 506 and its emitter is connected to the conductor 468 through the resistance 503.

The output of the transistor 500 is applied across the primary winding 510 of the input transformer 511 of the power amplifier 121 one side of the primary winding being connected through the blocking capacitor 511 to the common connection of its collecter and the resistance 503 and its other side being connected to the conductor 468. The power amplifier 121 may be of the push-pull type having a pair of transistors 514 and 515 whose bases are connected to opposite sides of the secondary winding 516 of the input transformer whose electric midpoint is connected to the common connection of the serially connected resistances 517 and 518 which constitute a voltage divider and are connected across the conductors 465 and 468. The collectors of the two transistors 514 and 515 are connected to opposite sides of a primary winding 520 of the output transformer 438 whose electric midpoint is connected to one side of the source 463 through the conductor 521. The electric midpoint of the primary winding is also connected to ground through the filter capacitor 523. The emitters of the two transistors are connected to the other side of the source 463 through the resistance 524 and ground and to the electric midpoint of the secondary winding 516 of the input transformer through the resistance 524, ground and the resistance 518.

It will now be seen that alternating current induced in the secondary winding of the output transformer 438 of the power amplifier 121 is of the same frequency as the alternating current output of the location strain gauge bridge 86 and therefore of the same frequency as the alternating current voltages induced in the secondary windings 412 and 413 of the output transformer 408 of the power amplifier 118. It will also be seen that the phase of alternating current induced in the secondary winding 437 may be shifted 180 degrees by the use of the switch 490 and through smaller angles by the adjustment of the position of the movable contact 492 on the potentiometer resistance 487 so that the alternating potential applied across the terminals 440 and 446 of the bridge diode 415 and the terminals 441 and 447 of the diode bridge 415 may be either exactly in or 180 degrees out of phase with the alternating current voltages applied across the terminals 416 and 417 of the diode bridge 414 and across the terminals 428 and 429 of the diode bridge 415.

The output of the integrator 122, whose output varies as indicated at C in FIGURE 4 as the wheels roll across the weigh rails, is applied to the first pair of transistors 530 and 531 of the direct coupled differential amplifier 123 through a current limiting circuit 533 which may include a pair of resistances 534 and 535 connected in series between the common connection of the inductance 419 and the resistance 420 of the integrator 122 and the base of the transistor 530 by the conductors 536 and 537. The common connection of the resistances 533 and 534 is connected to ground and therefore the other side of the resistance 420 by a pair of semi-conductors 539 and 540 connected reversely in parallel between ground and the common connection of the resistances 534 and 535. The base of the transistor 531 is connected to ground and therefore to the other side of the resistance 420 of the integrator through the conductor 541 and the resistance 542. The semi-conductors or diodes 539 and 540 are rendered conductive when the voltages thereacross exceed predetermined values and therefore limit the voltage of the input signal applied to the transistors 530 and 531.

The transistors 530 and 531 constitute the balanced input stage of the balanced differential amplifier 123, their collectors being connected to the source 543 of positive direct voltage through the conductor 544 and the resistances 545 and 546, respectively, and their emitters being connected to the source of negative voltage 548 through the collector emitter circuit of the balancing transistor 550 whose emitter is connected to one side of the source 548 through the resistance 551 and the conductor 552 and whose collector is connected to the emitters of the transistors 530 and 531 through the adjustable contact 554, the potentiometer resistance 555 and the resistances 556 and 557, respectively. The base of the balancing transistor 530 is connected to the common connection of the resistances 560 and 561 connected in series across the conductors 544 and 552. The outputs of the transistor 530 and 531 of the input stage of the amplifier 123 are applied to the transistors 563 and 564 which constitute the second stage of the amplifier. The common connection of the resistance 545 and the collector of the transistor 530 is connected to the base of the transistor 563 by the conductor 565 and the common connection of the resistance 546 and the collector of the transistor 531 is connected to the base of the transistor 564 by the conductor 566. The collectors of the transistors 563 and 564 are connected to the source 543 through the resistances 567 and 568, respectively, while their emitters are connected to the source of negative direct current voltage through the resistance 569 and the resistances 570 and 571, respectively. A filtering circuit which includes a resistance 573 and a capacitor 574 may be connected across the collectors of the transistors 530 and 531 and similarly the filter circuit comprising the resistance 576 and the capacitor 578 may be connected across the collectors of the transistors 563 and 564.

The output of the second stage of the amplifier is applied to the transistors 580 and 581 whose collector emitter circuits are connected across the conductors 544 and 552 through the collector emitter circuit of the transistor 582. The common connection of the resistance 567 and the collector of the transistor 563 is connected to the base of the transistor 580 by the conductor 584 and the common connection of the resistance 568 and the collector of the transistor 564 is connected to the base of the transistor 581 by the conductor 585. The collectors of the transistors 580 and 581 are connected to the source of negative voltage through the resistances 587 and 588 while their emitters are connected to the collector of the transistor 582 by the conductors 590 and 591. The emitter of the transistor 582 is connected to the source of direct positive voltage by the resistance 593. The base of the transistor 582 is connected to the common connection of the resistances 594 and 595 which are connected in series across the conductors 552 and 544.

The output of the transistor 580 is applied to the transistor 600 whose base is connected to the common connection of the resistance 587 and the collector of the transistor 580. The collector emitter circuits of the transistors 600 and 603 are connected in series across the conductors 544 and 546 by the resistance 604, the conductor 605 and the resistance 606. The base of the transistor 603 is connected to the common connection of the resistances 608 and 609 connected in series across the conductors 552 and 544.

The balanced differential amplifier 123 is balanced to zero at the common connection of the transistor 600 and the collector 602, amplifies the output of the integrator 122 and reverses it 180 degrees, and also provides a low impedance output to the threshold detector 124. A feed back circuit, which includes the resistances 611 and 612 connected in parallel, connects the conductor 605 and the base of the transistor 530 by means of the conductors 614, 615, 617 and 537.

The threshold detector 124 includes a pair of transistors 618 and 619 which constitute a difference amplifier, their emitters being connected to the source 620 of direct positive voltage through the conductor 622, the resistance 623 and the conductor 624 and their collectors being connected to the conductor 626, which is connected to a source of negative voltage 627 by the resistance 628 and the conductor 629, respectively. The base of the transistor 619 is connected to the potentiometer resistance 631, whose opposite sides are connected to the sources of positive and negative voltage 620 and 627 through the resistances 633 and 634, by means of the resistance 635 and the adjustable contact 636.

The output of the difference amplifier is applied to a flip-flop circuit which includes the transistors 640 and 641, the common connection of the resistance 628 and the collector of the transistor 618 being connected to the base of the transistor 640. The collectors of the transistors 640 and 641 are connected to ground through the resistances 644 and 645, respectively, and their emitters are connected to the source 627 of negative voltage through the resistance 647 and the conductor 626. The base of the transistor 641 is connected to ground through the resistance 648 and also to the common connection of the resistances 650 and 651 connected in series between the source of negative current and the conductor 653. The conductor 653 is connected to one side of the output circuit 655 of the threshold detector and to the common connection of the resistance 644 and the collector of the transistor 640, and the resistance 657 which is connected in series with the resistance 644 between the source of negative voltage and ground. The transistors of the flip-flop circuit operate in the usual manner to cause a pulse to be produced at the instant that the output of the amplifier 123 moves from positive to negative. The pulse output of the threshold director may thus be used to provide a logic trigger or signal for causing the operation of any suitable apparatus, such as the computer 170, at the instant of initiation of the pulse and thus at the exact moment that the wheels move over the midpoints of the spans of the weigh rails. The output of the flip-flop circuit will again drop to zero as the output continues to vary as indicated during the passage of the wheels over the weigh rails.

While theoretically the output of the location sensing bridge network 86 should be zero at the time that no loads are present on the weigh rails, various unbalances in the circuit components may cause the bridge network to have an output during no load conditions. It is desired that no such long term unbalance output whose duration is considerably longer than the period of time during which the wheels move over the weigh rails be balanced or cancelled out but that the short term unbalance of the bridge network due to the movement of a load over the weigh rails not be balanced out. In order to provide the desired balancing voltage to be induced in the secondary winding 670 of the balancing transformer 129 which is equal in amplitude and exactly opposite in phase to the unbalance output of the bridge network, the secondary winding 670 is connected across the output terminals of the location bridge network by the conductor 312, the resistance 673, the conductor 674, ground and the conductor 317. The output of the differential amplifier 123 is transmitted through the amplifier 125 to the modulator 126 whose output in turn is transmitted through the filter and amplifier 128 to the primary winding 671 of the balancing transformer.

The amplifier 125 and the modulator 126 are identical in structure to the amplifier 123 and the phase comparator 119, respectively. Accordingly elements of the amplifier 125 have been provided with the same reference characters, to which the subscript "a" has been added, as the corresponding elements of the amplifier 123 and the elements of the modulator 126 have been provided with the same reference characters, to which the sub-script "a" has been added, as the corresponding elements of the phase comparator 119.

The output of the amplifier 123 is applied to the bases of the transistors 530a and 531a of the amplifier 125 through a voltage limiting circuit which may include the resistances 680 and 681 connected in series between the conductor 605 and the base of the transistor 530a by the conductors 619, 682 and 683 and to the base of the transistor 531 to ground, the resistance 685 and the conductor 686. The semi-conductors 688 and 689 are connected reversely in parallel between the common connection of the resistances 680 and 681 and ground and are rendered conductive when the voltage applied thereacross exceeds predetermined values and thus limit the input voltage applied to the transistors 530a and 531a of the input stage of the differential amplifier 125.

The output of the amplifier 125 causes alternating current to flow through the windings 12a and 13a of the transformer 690 as the diode bridges 414a and 415a are rendered alternately conductive by the alternating voltage induced in the secondary winding 693 of the output transformer 694 of the driver 127. The output of the amplifier 125 is applied across the terminals 416 and 417a of the diode bridge 414a by the conductors 696, the resistance 697, the conductors 698 and 699, the winding 412a, the conductor 701, the conductor 704 and ground. The capacitor 705, one of whose sides is connected between the common connection of the resistance 697 and the winding 412a and whose other side is connected to ground, prevents any short term output of the amplifier 125 from causing any flow of current to the winding 412a since only a relatively long term output of the amplifier 125 causes the capacitor 705 to be charged to a sufficient extent to cause the output to be applied across the input terminals 416a and 417a of the bridge 414. The output of the amplifier 125 is similarly applied across the terminals 428a and 429a of the bridge 415a through the conductor 696, the resistance 697, the conductors 698, 705 and 706, the secondary winding 413a, the conductor 707 and ground. Since the diode bridges are alternately and periodically rendered conductive by the voltage induced in the secondary winding 693, current will flow in the windings 412a and 413a periodically at the frequency of the alternating current of the secondary winding 693 and with the amplitude determined by the output of the amplifier 125. The voltage of the secondary winding 708 of the transformer 707 is applied across the base emitter circuit of an amplifying transistor 712 of the amplifier and filter 128 since one side of the secondary winding 708 is connected to the base of the amplifier transistor through the resistance 714 and the conductor 715 and its other side is connected to its emitter through the conductor 717, the resistance 718, the conductor 719 and the resistance 720. An inductance 722 and capacitor 723 are connected in parallel across the resistance 714 and the secondary winding 708 to filter out undesired frequencies which may be induced in the secondary winding 708.

The resistance 718 is connected in series with a resistance 723 across the source of negative direct voltage 724, the resistance 723 being connected to the conductor 725 which is connected to one side of the source and the resistance 718 being connected to the conductor 719 which is connected to the other side of the source through ground. A capacitor 727 is connected across the resistances 718 and 723 and the filter capacitors 727 and 728 are connected across the resistances 718 and 723 and across the resistance 728, respectively. The collector emitter circuit of the amplifying transistor 712 is connected across the source 724, its collector being connected to the conductor 725 by the conductor 730 and its emitter being connected to the conductor 719 through the resistance 720. The output of the amplifying transistor 712 is applied across the primary winding 671 of the balancing transformer 129 since the common connection of its emitter and the resistance 720 is connected to one side of the primary winding through the blocking capacitor 733 and the conductor 734, the other side of the primary winding being connected to ground.

It will thus be apparent that the output of the modulator 126 is transmitted through the filter which includes the inductance 722 and the capacitor 723 and the amplifier which includes the amplifying transistor 712 to the primary winding 671 of the balancing transformer 129 which is modulated in accordance with the output of the amplifier 123.

The driver 127 which amplifies the output of the oscillator 87 which is applied across the diode bridges 414a and 415a includes an input transistor 740 whose base is connected to the common connection of the resistance 203 and the emitter 198 of the output transistor 200 of the oscillator 87 through the capacitor 742, the adjustable contact 743 of the potentiometer resistance 744, the capacitor 745 and the conductor 476. One side of the potentiometer resistance 744 is connected to ground. Bias is applied to the base of the transistor 340 by a voltage divider which includes resistances 748 and 749 connected in series across the conductors 719 and 725, the base of the input transistor 740 being connected to the common connection of the resistances. The collector emitter circuit of the input transistor is also connected across the resistances 719 and 725, its collector being connected to the conductor 725, and therefore to one side of the source 724, by the conductor 751 and its emitter being connected to the conductor 719, and therefore to the other side of the source 724, through the resistance 752. The output of the input transistor is applied across the primary winding 754 of the transformer 755, one of whose sides is connected to the common connection of the resistance 752 and the emitter of the input transistor through the blocking capacitor 756 and whose other side is connected to the conductor 719 and therefore to ground. The opposite sides of the secondary winding 760 are connected to the bases of the transistors 762 and 763 whose emitters are connected to the electric midpoint of the secondary winding through the resistance 764, the conductor 719 and the resistance 765. A filter capacitor 766 is connected across the resistance 765. The electric midpoint of the secondary winding of the input transformer 755 is connected to the common connection of the resistances 765 and 768 which are connected in series across the conductors 719 and 725, and thus across the source of current 724, to provide bias to the bases of the transistors. The collector emitter circuits of the threshold transistors 762 and 763 are connected across the source of current 724 through the primary winding 770 of the output transformer 694, their collectors being connected to opposite sides of the primary winding whose electric midpoint is connected to the conductor 725 through the conductor 774 and their emitters being connected to the conductor 719 through the resistance 764.

It will thus be apparent that the frequency of the alternating voltage applied to the diode bridges is the same as the frequency of the alternating voltage output of the location bridge network 86 since both are derived from the common oscillator 87 and that the output of the modulator 126 is modulated in accordance with the long term unbalance signal of the amplifier 123 so that any output of the bridge network 86 due to a long term unbalance is cancelled out by a voltage of the same frequency and amplitude but of opposite phase induced in the secondary winding 760 of the balancing transformer 129.

It will now be apparent that a new and improved control circuit has been illustrated and described which is responsive to the phase reversal of phase of an alternating voltage to provide a control signal which may cause the operation of a suitable controlled apparatus, such as a computer, and that such control circuit includes a common source of alternating voltage such as the oscillator 87 whose output is applied to a sensing means such as the transducer 86, whose output varies with variations in a predetermined condition, such as the location of the point of application of a mechanical force to the transducer; a phase comparator which compares the phase of the output of the transducer 86 with the phase of its exciting voltage; means, such as the integrator 122, for filtering out the reference or carrier frequency from the output of the phase comparator; an amplifier, such as the amplifier 123, for amplifying the output of the integrator and a means, such as the threshold detector 124, for converting the output of the amplifier into an electrical pulse or signal which may act as a logic trigger and initiate or control the operation of any suitable apparatus, such as a computer.

It will further be apparent that the control circuit may include a means for balancing the long term unbalance output of the transducer prior to its amplification by the amplifier 117 which may include the amplifier 125 which amplifies the output of the amplifier 123, a modulator 126 supplied with alternating current from the common source or oscillator 87 to which is applied the output of the amplifier 125 to cause an alternating voltage, modulated in accordance with the output of the amplifier 125, to be applied across the output of the transducer to cancel out such long term unbalance output thereof.

It will further be apparent that while the operation of the control of the transducer and the control circuit has been described in connection with a weighing apparatus employing a pair of weigh rails which requires that, for maximum accuracy, the computation of the weight be made at the instant that the wheels are at the midpoints of the spans of the weigh rails and therefore at the moment of the reversal of the phase of the alternating voltage output of the transducer since the loads imposed on the weigh rails by different pairs of wheels may vary, that the transducer may be employed to give an indication of the position of such wheels or bodies along the weigh rail other than at the midpoints of the spans of the beams if the weights of such bodies are equal. In this case, the difference amplifier of the threshold detector, by proper adjustment of the adjustable contact 636 on the potentiometer resistance 631, causes the flip-flop circuit to function to provide a control pulse or signal at times other than at the instant of reversal of the phase of the output of the location strain gauge, either before or after the reversal of the phase, and therefore when the wheels are at any predetermined locations along the length of the weigh rails.

It will further be seen that while particular amplifiers, phase comparator, threshold detector, and modulator have been illustrated and described that various other such circuits may be combined to provide a control circuit and apparatus embodying the invention.

It will further be seen that while the transducers or strain gauges have been illustrated and described as being bonded to the bottom surface of the weigh rail so that their resistances increase as the load moves over the rail at the locations of the strain gauges, the strain gauges may be bonded to the side of the weigh rail in vertical positions so that their resistances would decrease as the load moves over the weigh rail at the locations of the strain gauges. In this case, the input and output terminals of the bridge network in which the strain gauges are connected would be reversed to provide the same output signal during the movement of the load over the weigh rail.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus for sensing the position of a moving body including: a beam; means supporting said beam at longitudinally spaced locations whereby said beam is free to deflect downwardly as the body moves longitudinally over said beam; means for sensing the deflection of said beam at points spaced longitudinally equidistantly from and on opposite sides of the midpoint of the span of said beam between said spaced locations; and means operatively associated with said sensing means for producing an alternating voltage whose phase shifts 180 degrees at the instant said body moves past the midpoint of the span of said beam during its longitudinal movement over said beam.

2. An apparatus for sensing the position of a moving body including: a beam; means supporting said beam at longitudinally spaced locations whereby said beam is free to deflect downwardly as the body moves longitudinally over said beam; means for sensing the deflection of said beam at points spaced longitudinally equidistantly from and on opposite sides of the midpoint of the span of said beam between said spaced locations; means operatively associated with said sensing means for producing an alternating voltage whose phase shifts 180 degrees at the instant said body moves past the midpoint of the span of said beam during its longitudinal movement over said beam; and means responsive to the shifting of the phase of said alternating voltage for producing a control signal.

3. A location detecting apparatus including: a beam; support means spaced longitudinally of said beam for supporting said beam and permitting downward deflection of said beam between said supporting means as a body moves over said beam; a pair of strain gauges secured to the bottom of said beam between said support points on opposite sides of the midpoint of span of said beam and spaced equidistantly from the midpoint, the resistances of the strain gauges increasing with the downward deflection of said beam; and an electric bridge network, said strain gauges being connected in said bridge network to vary the output of said bridge network in accordance with the position of the body moving across said beam; means exciting said bridge network with alternating current of a predetermined frequency, said bridge network having an alternating voltage output whose phase shifts 180 degrees as said body mvoes past the midpoint of the span of said beam; and means responsive to the shift in phase of said output of said bridge network providing a control signal at the instant of movement of the body past the midpoint of the span of the beam.

4. A location detecting apparatus including: a beam; support means spaced longitudinally of said beam for supporting said beam and permitting downward deflection of said beam between said supporting means as a body moves over said beam; a pair of strain gauges secured to the bottom of said beam between said support points on opposite sides of the midpoint of span of said beam and spaced equidistantly from the midpoint, the resistances of the strain gauges increasing with the downward deflection of said beam; and an electric bridge network, said strain gauges being connected in said bridge network to vary the output of said bridge network in accordance with the position of the body moving across said beam; means exciting said bridge network with alternating current of a predetermined frequency, said bridge network having an alternating voltage output whose phase shifts 180 degrees as said body moves past the midpoint of the span of said beam; means for comparing the phase of the alternating voltage output of said bridge with the phase of the current frequency of the alternating voltage exciting said bridge network; and means operatively associated with said phase comparing means providing a control signal at the instant of movement of the body past the midpoint of the span of the beam.

5. A location detecting apparatus including: a beam; support means spaced longitudinally of said beam for supporting said beam and permitting downward deflection of said beam between said supporting means as a body moves over said beam; a pair of strain gauges secured to the bottom of said beam between said support points on opposite sides of the midpoint of span of said beam and spaced equidistantly from the midpoint, the resistances of the strain gauges increasing with the downward deflection of said beam; and an electric bridge network, said strain gauges being connected in said bridge network to vary the output of said bridge network in accordance with the position of the body moving across said beam; means exciting said bridge network with alternating current of a predetermined frequency, said bridge network having an alternating voltage output whose phase shifts 180 degrees as said body moves past the midpoint of the span of said beam; means for comparing the phase of the alternating voltage output of said bridge with the phase of the current frequency of the alternating voltage exciting said bridge network; means operatively associated with said phase comparing means providing a control signal at the instant of movement of the body past the midpoint of the span of the beam; and means for balancing the long term unbalance output of said bridge network.

6. A location detecting apparatus including: a beam; support means spaced longitudinally of said beam for supporting said beam and permitting downward deflection of said beam between said supporting means as a body moves over said beam; a pair of strain gauges secured to the bottom of said beam between said support points on opposite sides of the midpoint of span of said beam and spaced equidistantly from the midpoint, the resistances of the strain gauges increasing with the downward deflection of said beam; and an electric bridge network, said strain gauges being connected in said bridge network to vary the output of said bridge network in accordance with the position of the body moving across said beam; means exciting said bridge network with alternating current of a predetermined frequency, said bridge network having an alternating voltage output whose phase shifts 180 degrees as said body moves past the midpoint of the span of said beam; means for comparing the phase of the alternating voltage output of said bridge with the phase of the current frequency of the alternating voltage exciting said bridge network; means operatively associated with said phase comparing means providing a control signal at the instant of movement of the body past the midpoint of the span of the beam; and means responsive to the output of said phase comparing means operably associated with said bridge network for balancing the long term unbalance output of said bridge network.

7. An apparatus for sensing the position of a moving body including: a beam; means supporting said beam at longitudinally spaced locations whereby said beam is free to deflect downwardly as the body moves longitudinally over said beam; means for sensing the deflection of said beam at longitudinally spaced points between said spaced locations; and means operatively associated with said sensing means for producing an alternating voltage whose phase shifts one hundred eighty degrees at the instant said body moves past a predetermined point along said beam during its longitudinal movement over said beam.

8. An apparatus for sensing the position of a moving body including: a beam; means supporting said beam at longitudinally spaced locations whereby said beam is free to deflect downwardly as the body moves longitudinally over said beam; means for sensing the deflection of said beam at longitudinally spaced points between said spaced locations; means operatively associated with said sensing means for producing an alternating voltage whose phase shifts one hundred eighty degrees at the instant said body moves past a predetermined point along said beam during its longitudinal movement over said beam; and means responsive to the shifting of the phase of said alternating voltage for producing a control signal.

9. A location detecting apparatus including: a beam; support means spaced longitudinally of said beam for supporting said beam and permitting downward deflection of said beam between said supporting means as a body moves over said beam; a pair of strain gauges secured to the bottom of said beam spaced longitudinally between said support means, the resistances of the strain gauges varying with the downward deflection of the beam; and an electric bridge network, said strain gauges being connected in said bridge network to vary the output of said bridge network in accordance with the position of the body along said beam, said bridge network providing an alternating voltage whose phase shifts in accordance with the position of the body along said beam.

10. A location detecting apparatus including: a beam; support means spaced longitudinally of said beam for supporting said beam and permitting downward deflection of said beam between said supporting means as a body moves over said beam; a pair of strain gauges secured to the bottom of said beam spaced longitudinally between said support means, the resistances of the strain gauges varying with the downward deflection of the beam; an electric bridge network, said strain gauges being connected in said bridge network to vary the output of said bridge network in accordance with the position of the body along said beam, said bridge network providing an alternating voltage whose phase shifts in accordance with the position of the body along said beam; and means responsive to the output of said bridge network providing an electric control signal at the instant of movement of the body past a predetermined point along said beam.

11. An apparatus including: a transducer comprising: first means providing an alternating current output whose phase is shiftable through one hundred eighty degrees upon the application of a mechanical force to said first means; means for comparing the phase of the output of said first means with the phase of an alternating voltage of a predetermined reference frequency; and means responsive to the output of said phase comparing means for producing a control signal when the output of said first means shifts one hundred eighty degrees.

12. A control circuit for a transducer excited by alternating voltage of a reference frequency including: a source of alternating voltage of said reference frequency for exciting said transducer, the output of said transducer varying in accordance with the location of the point of application of the mechanical force to the transducer; a phase comparator for comparing the phase of the output of said transducer with said alternating voltage of said source for providing an alternating voltage output which varies in accordance with the amplitude and phase of the output of the transducer; means for filtering out said reference frequency from the output of said phase comparator; means for amplifying the output of said integrator; and means for converting the output of said amplifier to an electric control signal at the instant of the application of the mechanical force to the transducer at a predetermined location thereon.

13. A control circuit for a transducer excited by alternating voltage of a reference frequency including: a source of alternating voltage of said reference frequency for exciting said transducer, the output of said transducer varying in accordance with the location of the point of application of the mechanical force to the transducer; a phase comparator for comparing the phase of the output of said transducer with said alternating voltage of said source for providing an alternating voltage output which varies in accordance with the amplitude and phase of the output of the transducer; means for filtering out said reference frequency from the output of said phase comparator; means for amplifying the output of said integrator; means for converting the output of said amplifier to an electric control signal at the instant of the application of the mechanical force to the transducer at a predetermined location thereon; and balancing means energized by the output of said amplifier for impressing a potential across said transducer for balancing the long term unbalance output of said transducer.

14. A control circuit for a transducer excited by alternating voltage of a reference frequency including: a source of alternating voltage of said reference frequency for exciting said transducer, the output of said transducer varying in accordance with the location of the point of application of the mechanical force to the transducer; a phase comparator for comparing the phase of the output of said transducer with said alternating voltage of said source for providing an alternating voltage output which varies in accordance with the amplitude and phase of the output of the transducer; means for filtering out said reference frequency from the output of said phase comparator; means for amplifying the output of said integrator; means for converting the output of said amplifier to an electric control signal at the instant of the application of the mechanical force to the transducer at a predetermined location thereon; and balancing means energized by the output of said amplifier for impressing a potential across said transducer for balancing the long term unbalance output of said transducer, said balancing means including a modulator connected to said source of alternating voltage and to said amplifier whereby the output of said modulator has the same frequency as said output of said strain gauge and is modulated in accordance with the output of said amplifier.

15. A control circuit for a transducer excited by alternating voltage of a reference frequency including: a source of alternating voltage of said reference frequency for exciting said transducer, the output of said transducer varying in accordance with the location of the point of application of the mechanical force to the transducer; a phase comparator for comparing the phase of the output of said transducer with said alternating voltage of said source for providing an alternating voltage output which varies in accordance with the amplitude and phase of the output of the transducer; means for filtering out said reference frequency from the output of said phase comparator; means for amplifying the output of said integrator; means for converting the output of said amplifier to an electric control signal at the instant of the application of the mechanical force to the transducer at a predetermined location thereon; and means connected to said amplifier and said modulator for impressing an alternating potential of the same frequency and amplitude but of opposite phase across the output of said transducer to balance the long term output of said transducer.

References Cited

UNITED STATES PATENTS

| 3,155,184 | 11/1964 | Raskin | 177—163 |
| 3,159,227 | 12/1964 | Raskin et al. | 177—163 |
| 3,168,153 | 2/1965 | Dinter et al. | 177—211 X |

RICHARD B. WILKINSON, *Primary Examiner.*

G. H. MILLER, *Assistant Examiner.*